March 5, 1935. L. FULLEN 1,993,157
LUGGAGE RETAINER
Filed May 4, 1933
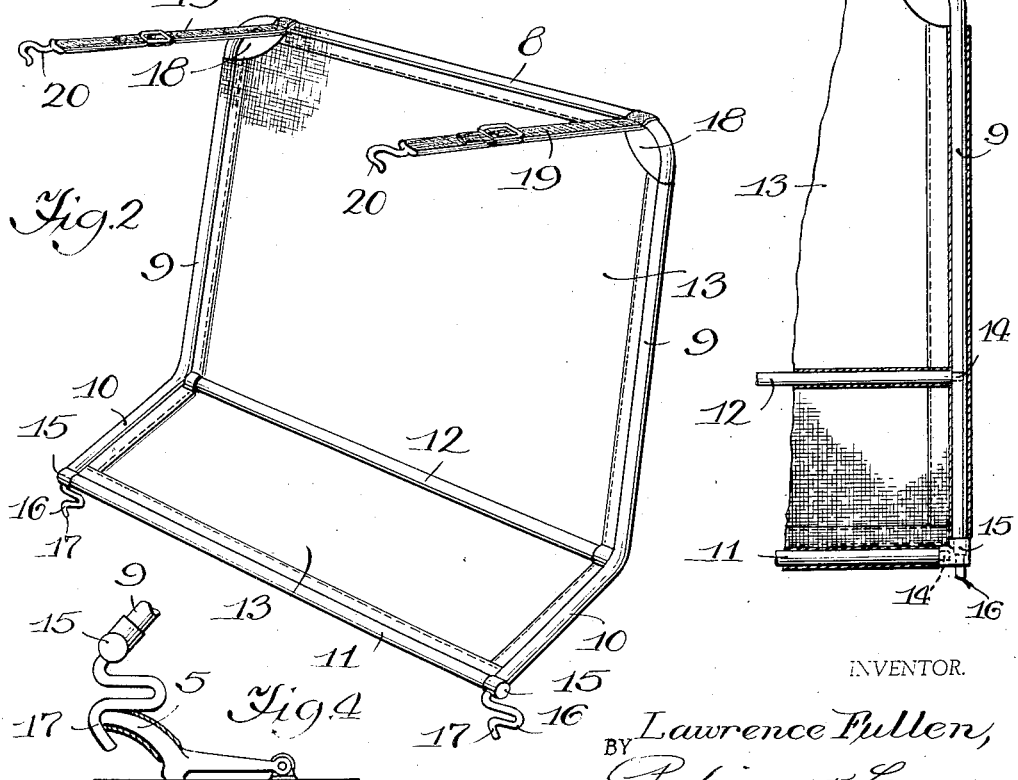
INVENTOR.
Lawrence Fullen,
BY Parkinson & Lane
ATTORNEY.

Patented Mar. 5, 1935

1,993,157

UNITED STATES PATENT OFFICE 1,993,157

LUGGAGE RETAINER

Lawrence Fullen, Chicago, Ill.

Application May 4, 1933, Serial No. 669,358

3 Claims. (Cl. 224—29)

The present invention relates to luggage retainers and more in particular to a novel construction of holding or retaining means adapted to be positioned within the automobile for retaining luggage and the like.

Among the objects of the present invention is to provide a luggage retainer for receiving luggage, travelling equipment, golf bags, and other and various articles, and retaining the same in a compact space out of the way of the occupants of the automobile.

A further object of the invention is the provision of a luggage retainer or holding means adapted to be positioned in an automobile rearwardly of the front seat and detachably connected to the rear of the front seat and forming a compartment between it and the front seat and floor for retaining luggage, travelling equipment, golf bags, and other articles or packages.

A still further object is to provide a readily detachable and adjustable carrier or retainer for luggage and the like which is positioned intermediate the front and rear seats and which may be easily and quickly placed in position or removed, and when in position does not affect the necessary leg room or space for the feet of the occupants of the rear seat.

Another object of the present invention is the provision of a novel construction of luggage retainer which occupies very little space when in or out of position, and which can be readily and cheaply made.

Further objects are to provide a construction of maximum simplicity, efficiency, economy and ease of assembly and operation, and such further objects, advantages and capabilities as will later more fully appear and are inherently possessed thereby.

The invention further resides in the combination, construction and arrangements of parts illustrated in the drawing, and while there is shown therein a preferred embodiment, it is to be understood that the same is susceptible of modification and change and comprehends other details, arrangements of parts, features and constructions, without departing from the spirit of the invention.

In the drawing:

Fig. 1 is a fragmentary view in perspective of the interior of an automobile intermediate the front and rear seats, and showing an embodiment of the invention in position.

Fig. 2 is a view in perspective of the luggage retainer.

Fig. 3 is a fragmentary view in side elevation with parts thereof in vertical cross section whereby to show the method and means of connecting the frame members and covering.

Fig. 4 is a fragmentary view in side elevation of a leg or projection mounted upon or seating on the foot rest.

Fig. 5 is a fragmentary view in side elevation of a projection or leg seating on the floor of a car when the car is not provided with a foot rest.

Fig. 6 is a fragmentary view disclosing the adjustable strap which is detachably connected directly to the back or rear of the seat when the front seat is not provided with a robe rail.

Referring more particularly to the disclosure in the drawing, the embodiment selected to illustrate the invention is shown as positioned in an automobile body 1 provided with a front seat 2 and a rear seat 3, the floor 4 of the machine being provided with the usual foot rest 5 and the front seat 2 being provided with a robe rail 6 mounted upon brackets 7 connected to the rear of the front seat.

The novel luggage retainer comprises a frame having a top rail 8 and side rails 9 which in the present embodiment are shown as constructed of a single section of tubing, although it is to be understood that the top and side rails may be made separate and connected together in any suitable manner. The side rails adjacent their lower ends are bent or inclined inwardly and downwardly as at 10, and are connected by a lower rail 11 and an intermediate rail 12 whereby to add rigidity and strength to the construction, and to maintain the fabric 13 taut or stretched.

As disclosed in Fig. 3, the bottom and intermediate rails 11 and 12 are shown as provided with reduced ends 14, the reduced ends of the intermediate rail seating within openings in the side rail 9 and suitably connected thereto, while the lower rail 11 seats within a coupling 15 mounted on the ends of the side rails 9 and which are each suitably connected to one of the coupling members. Also mounted within the coupling members 15 are provided legs or extensions 16 having downwardly and rearwardly projecting ends 17 adapted to hook over the foot rest 5.

The fabric 13 which may be of duck, canvas or other suitable material, is cut out at 18. Straps or other suitable detachable connecting means 19 have their one end anchored on the upper rail 8 of the frame within the cut-out portion 18 and their opposite ends are provided with hooks or other suitable connecting means 20 adapted to connect to the cross or robe rail 6. When the retainer is in position as shown in Fig. 1, it provides a compartment with it forming one side and the floor of the car and rear of the front seat 2 forming the other two sides. This compartment is adapted to receive and retain luggage, travelling equipment, golf bags and other articles and packages. The straps 19 are shown as adjustable whereby the retainer may be positioned closer or further away from the rear of the front seat so as to adjust the size of the compartment formed thereby.

In Fig. 5 there is disclosed a means for mounting the legs or projections 16 whenever the car is not equipped with a foot rest. In this construction, the ends or extensions 17 each seat within an opening in a plate or bracket 21 mounted on the floor of the car.

If the front seat is not provided with a robe rail, the rear thereof may be provided with screw members having eyes 22 or other suitable anchoring means to which the hooks 20ᵃ of the adjustable straps 19 may be connected when the retainer is placed in position, as clearly disclosed in Fig. 6.

It will be readily apparent that the retainer occupies a minimum of space and does not affect the leg room in the rear of the car. Due to its lower inclined portion, there is provided room for the feet of the occupants upon the foot rest or floor of the car so that they are in no wise cramped for lack of suitable leg or foot room. When the retainer is not in use, its position may be reversed in which case the body of the member will be placed against the back of the rear seat where it will be out of the way.

From the above description and the disclosure in the drawing, it will be readily apparent that the invention comprehends a novel construction of luggage retainer which may be assembled or disassembled in a very few seconds and which may be readily and cheaply made. The compartment formed thereby when the novel structure is in position, is sufficient to receive and retain the usual travelling equipment or luggage, golf bags and the like, and maintain them within the car and out of the weather. This has been one of the main objections of the usual luggage carriers which are mounted on the exterior of the car and which provide no protection against the weather. The present invention also has another advantage in that it does not mar the appearance of the car. In the prior luggage carriers where the luggage was mounted on the running board, such luggage would frequently mar the appearance and surface of the car as well as make it more difficult for the occupants to leave or enter. Although the invention is shown in a closed car, it is admirably adapted for an open car, and in fact, any car having rear and front or spaced seats.

Having thus disclosed the invention,

I claim:

1. A luggage retainer for the interior of an automobile for receiving and retaining luggage and the like, comprising a partition member spaced from the front seat and forming a compartment with the floor and the front seat and having its top and opposite ends open for receiving the luggage and the like, said member forming but one side of the compartment with the front seat and floor forming the other two sides, and adjustable means on said member for connecting it to the seat, said means permitting adjustment of the size and capacity of said compartment.

2. A luggage retainer adapted to be adjustably positioned in the interior of an automobile and comprising a frame member spaced from the front seat and forming a compartment with the rear of the front seat and the floor and having its opposite ends open, said member forming but one side of the compartment with the front seat and floor forming the other two sides, extensions provided at the opposite sides of said frame member for engagement with the foot rest or floor of the automobile, and adjustable straps on the top of said frame adapted to be connected to the robe rail or rear of the seat.

3. A luggage retainer adapted to be adjustably positioned in the interior of an automobile and comprising a frame member spaced from the front seat and providing one side of a compartment formed with the rear of the front seat and the floor, said frame being provided with an upwardly extending portion and a downwardly inclined portion, lugs provided at the opposite ends of said inclined portion and adapted to hook over the foot rest on the floor of the automobile, and detachable members at the top of the frame adapted to be attached to the robe rail on the rear of the front seat, said members being adjustable whereby to vary the size and capacity of the compartment.

LAWRENCE FULLEN.